Figure 1:
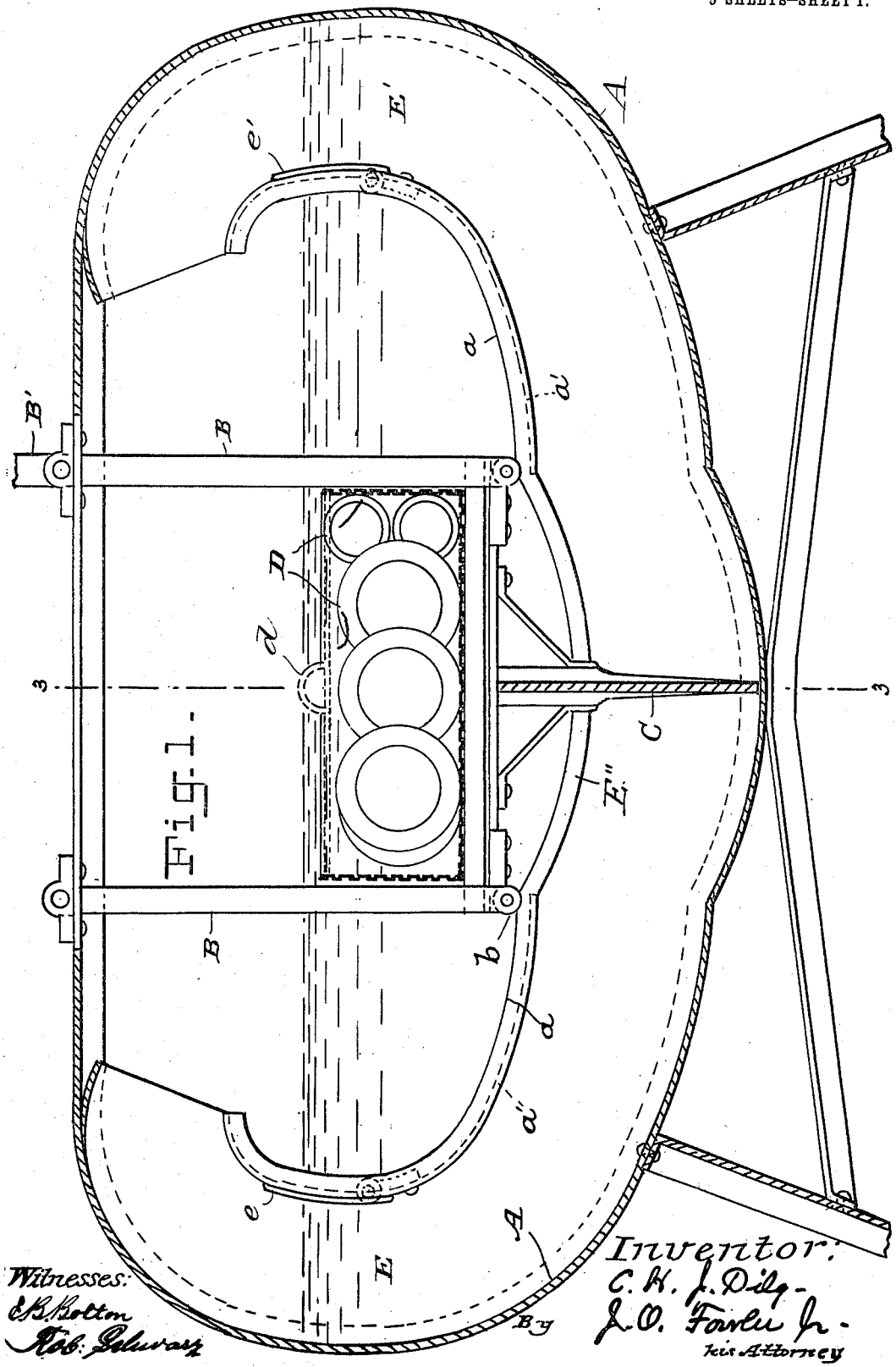

C. H. J. DILG.
MACHINE FOR WASHING DISHES.
APPLICATION FILED SEPT. 12, 1904.

982,578.

Patented Jan. 24, 1911.
5 SHEETS—SHEET 1.

Witnesses:
Inventor:
C. H. J. Dilg
J. O. Fowler Jr.
his Attorney

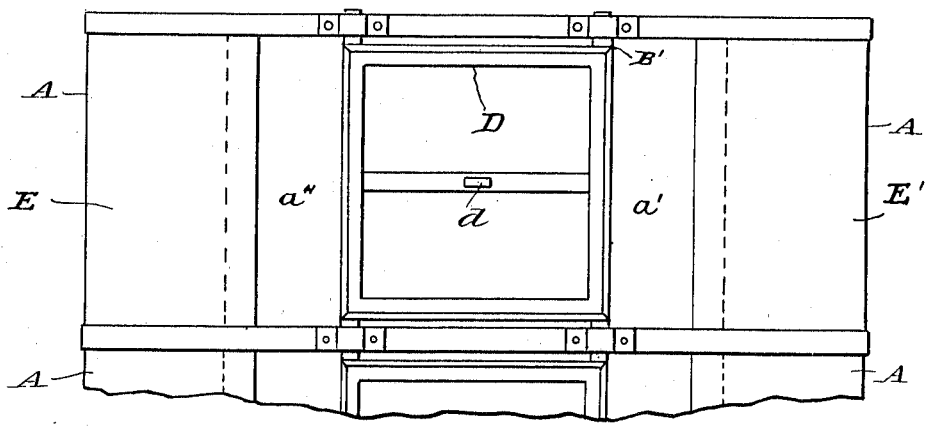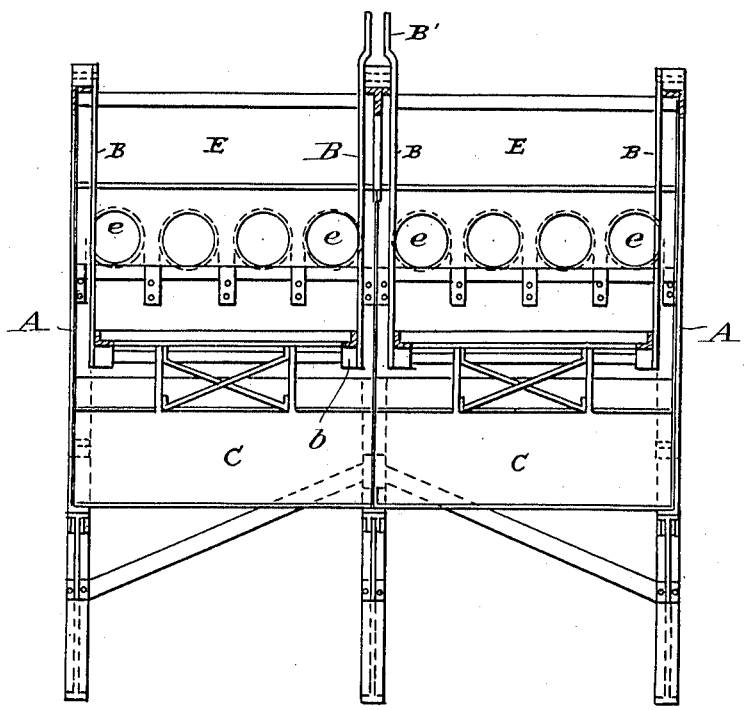

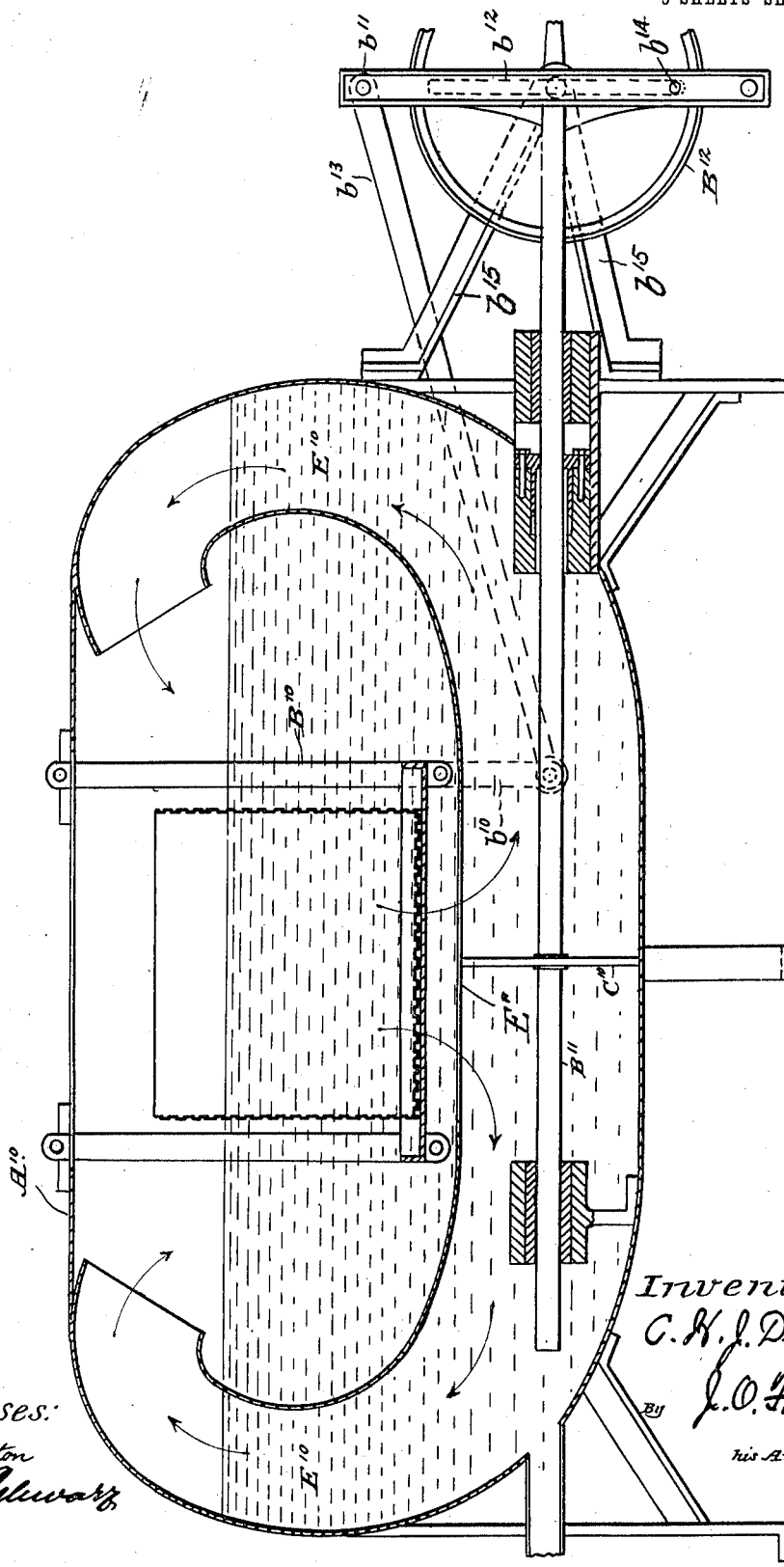

C. H. J. DILG.
MACHINE FOR WASHING DISHES.
APPLICATION FILED SEPT. 12, 1904.

982,578.

Patented Jan. 24, 1911.
5 SHEETS—SHEET 4.

WITNESSES
S. Herzog
A. E. Smith

C. H. J. Dilg INVENTOR
BY J. O. Fowler Jr.
ATTORNEY

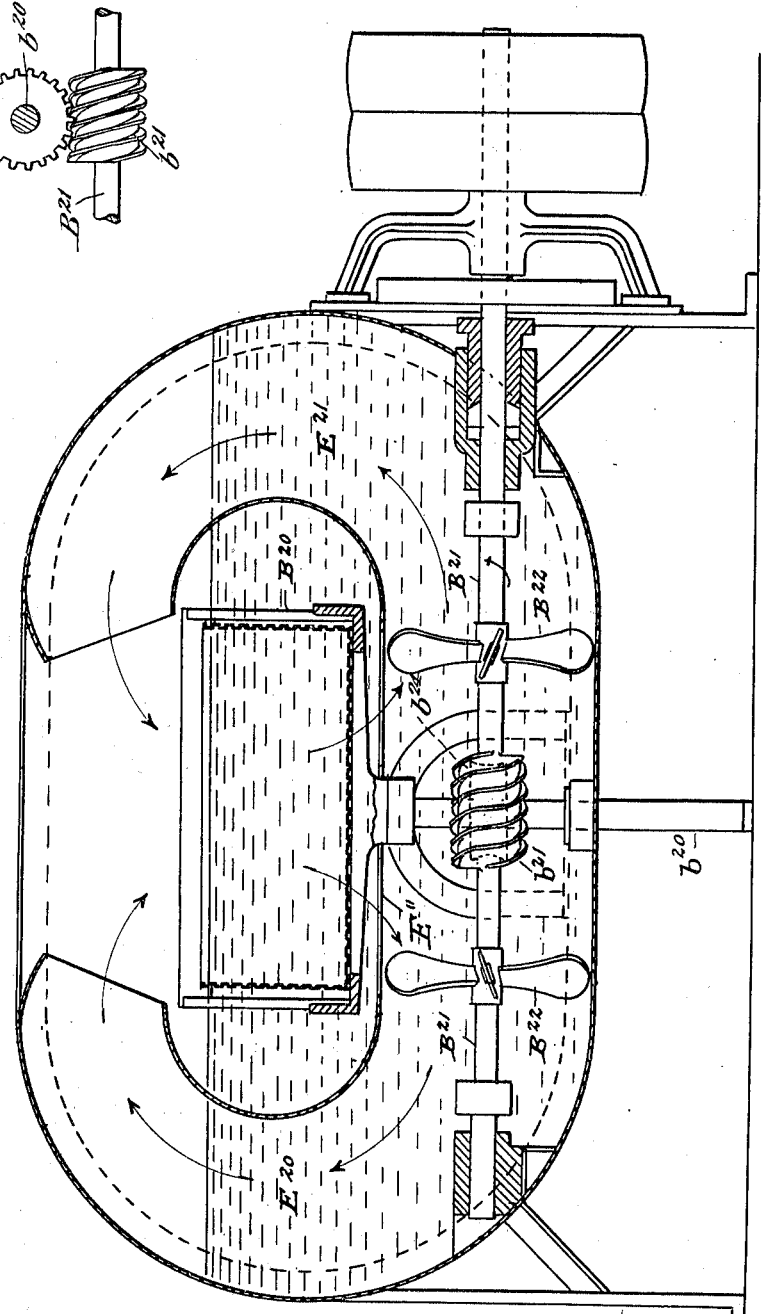

UNITED STATES PATENT OFFICE.

CHARLES H. J. DILG, OF NEW YORK, N. Y.

MACHINE FOR WASHING DISHES.

982,578.  Specification of Letters Patent.  Patented Jan. 24, 1911.

Application filed September 12, 1904. Serial No. 224,224.

*To all whom it may concern:*

Be it known that I, CHARLES H. J. DILG, a citizen of the United States of America, and a resident of New York, in the county of New York and State of New York, certify that I have invented a certain new and useful Machine for Washing Dishes, &c., of which the following is a specification, the same being a full, clear, and exact description of the invention, such as will enable others skilled in the art to which it appertains to make and use the same.

My invention relates to machines in which a liquid, as for example, water, is used for detergent purposes, as in washing, scouring and cleansing articles, and in which a receptacle is suitably mounted so as to be adapted for movement through the liquid, and is also subjected to a preferably practically continuous forced and rapid circulation of the fluid, which operations are ordinarily carried on at the same time, or in unison; and it has for its object to make a machine of improved and simple construction, and of increased efficiency, and which may be readily handled and easily operated.

With this object in view, the invention consists in certain novel features of construction and combination and arrangement of parts, all of which will be hereinafter described and specifically illustrated in the drawings which accompany and form a part of this specification, in which—

Figure 4A:
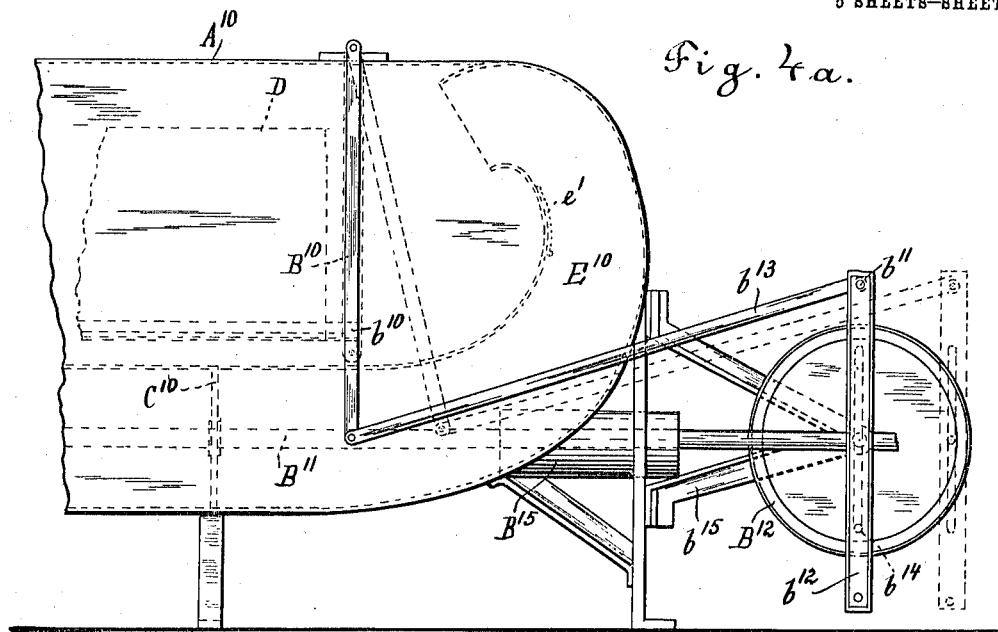
Figure 4B:
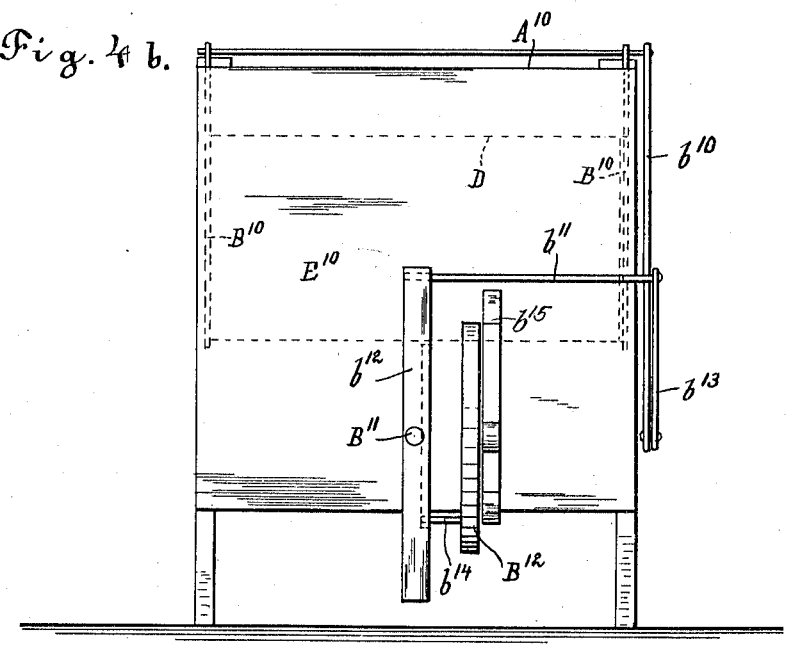

Figure 1 represents an elevation of a machine constructed according to my invention, with the side of the casing removed; Fig. 2 is a plan view of a portion of the device shown in Fig. 1, and Fig. 3 is a cross section on the line 3—3 Fig. 1, the outer casing being removed in Fig. 3; Figs. 4 and 5 are elevations of other machines in which my invention is embodied, the sides of the casing of the same being removed; Fig. 4$^a$ is a view in detail of one side of the mechanism in Fig. 4; Fig. 4$^b$ is an end view of the same; and Fig. 5$^a$ is a detail plan view of the worm and worm wheel shown in Fig. 5.

Like letters of reference indicate like parts in all the views.

Referring particularly to the drawings, A denotes the casing of the machine which is closed in at the sides and bottom thereof, in order to form a water chamber, and which is ordinarily left open at the top.

A rock frame B, consisting of suspending bars and horizontal rods hinged thereto, is pivotally hung from the top of the casing, at the lower end portions of which frame are located rollers $b$, which work on curved tracks $a$.

The pair of tracks positioned at each side of the rock frame serve to support a bottom having an opening E'' comprising plates or partitions $a'$ and $a^{11}$, which serve to divide the interior of the machine into two chambers, and by means of which partitions, conduits or spouts are formed at the upper part of each side of the outer chamber between the said partitions and the casing or outer walls of the machine. The said partitions and the outer walls of the machine, forming the said conduits or spouts E, E', rise from the outer chamber at or near each end of the machine and extend upwardly in a curve to the top of the said machine, and then depend somewhat in order to throw or direct the water passing through the same in a downward direction into the inner chamber and toward the center of the machine.

The rock frame B has a paddle C depending therefrom, and the central lower portion of the machine is preferably constructed and arranged to conform in contour with the arc described by the end of the said paddle in its to-and-fro, or oscillatory movement. An arm B' projecting upwardly from the said rock frame serves as a means for actuating the same.

A receptacle D for holding dishes is placed within the rock frame B beneath the surface of the water, and upon the said frame being moved sidewise, or to the right, by the manually actuated arm B', the water will be forced up through the right hand conduit E' by the action of the paddle C (said upward motion of the water closing the valve $e'$ located in the partition $a'$) which water is then allowed to drop downward into the inner chamber, so as to fall on the dishes at the same time that the rock frame is approaching said stream while moving through the liquid.

When the rock frame B is moved in the opposite direction, or to the left, it forces the water outward through the opening in the conduit E into the inner chamber, thus closing the valve $e$, and the suction in the conduit E', by the movement of the paddle backward from the same, causes the valve $e'$ to open and allow the liquid in the inner chamber to flow into the outer chamber again, which operation is practically continuously repeated. The dishes are thus subjected to a plurality of currents of water, one formed by moving the dishes sidewise through the liquid and the other caused by the forcible ejection of the fluid from the side spouts or conduits, so as to fall upon the dish holding receptacle, which latter works with a practically constant movement.

The casing A is, in the present embodiment, partitioned in the center in order to form a duplex machine, as shown in Fig. 3, and is also provided with duplicate operating mechanism, so that, if desired, one side compartment or tank of the machine may be utilized for washing dishes, and the other part for rinsing the same.

In the embodiment of my invention shown in Fig. 4, and Fig. 4$^a$ the rock frame $B^{10}$ is hung in the casing $A^{10}$ and provided on the exterior of the same with a depending arm $b^{10}$ which is connected by a link $b^{13}$ with the pin $b^{11}$ working in the grooved bar $b^{12}$ which latter reciprocates in unison with the rotation of the wheel $B^{12}$ by means of the engagement with the slot in the bar $b^{12}$ of the pin $b^{14}$ located within the periphery of and projecting from the wheel $B^{12}$ which is mounted on the support $b^{15}$. In this instance, the piston $C^{10}$ is fastened to the reciprocating rod $B^{11}$ working in bearings $B^{15}$ having rigidly attached thereto the grooved bar $b^{12}$, and the movement of the piston $C^{10}$, causes the water to be ejected through the conduits or spouts $E^{10}$ from which it falls into the inner chamber, and enters the outer chamber through an opening $E^{11}$ in the bottom of the inner chamber, from which outer chamber the liquid is again forced up into the spouts or conduits again in the manner described before.

I sometimes prefer to rotate the receptacle containing the dishes and also to subject the same to a positively continuous, instead of an intermittent current of water as in the structure shown in Fig. 5, where the frame $B^{20}$ is mounted on a rod $b^{20}$ carrying a worm wheel $b^{24}$ actuated by a worm $b^{21}$ carried by the shaft $B^{21}$ upon which shaft are also mounted screws $B^{22}$ by which the fluid is forced in opposite directions up through the conduits or spouts $E^{20}$, $E^{21}$, and then after falling into the inner chamber, passes through the opening in the bottom of the same to the outer chamber which communicates with the said conduits or spouts, the direction of the current of water being indicated in the drawings by arrows.

I wish it to be understood that I do not desire to be limited to the exact details of construction shown and described, for, obviously, modifications will occur to a person skilled in the art.

What I claim as my invention, is:—

1. In a machine of the class described, a tank to hold a liquid, partitions to divide the same into inner and outer communicating compartments, the upper terminals of the partitions and the upper portions of the tank forming spouts the ends of which are directed toward the center of the tank, a receptacle to hold articles located within the inner compartment, means to set the receptacle in motion, means located in the outer compartment adapted to force the liquid in different directions along the said compartment and out of the spouts when the receptacle is moved.

2. In a machine of the class described, the combination of a tank, a partition to divide the same into inner and outer communicating compartments, an upper terminal of the partition and an upper portion of the tank forming a spout, a receptacle within the tank, means to move the receptacle, means to force the liquid along the outer compartment and out of the spout, and means to actuate the said receptacle-moving and liquid-propelling means.

In testimony of the foregoing specification I do hereby sign the same in the city of New York and State of New York this second day of August, 1904.

CHAS. H. J. DIIG.

Witnesses:
C. A. BECK,
O. FRIDLUND.